US012045243B2

(12) United States Patent
Ackermann et al.

(10) Patent No.: US 12,045,243 B2
(45) Date of Patent: Jul. 23, 2024

(54) RANKING ENTITY SEARCH RESULTS BASED ON INFORMATION DENSITY

(71) Applicant: International Business Machines Corporation, Armonk, NY (US)

(72) Inventors: Christopher F. Ackermann, Fairfax, VA (US); Charles E. Beller, Baltimore, MD (US); Michael Drzewucki, Woodbridge, VA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 17/542,412

(22) Filed: Dec. 4, 2021

(65) Prior Publication Data
US 2023/0177058 A1    Jun. 8, 2023

(51) Int. Cl.
*G06F 16/2457* (2019.01)
*G06F 16/248* (2019.01)
*G06F 16/93* (2019.01)

(52) U.S. Cl.
CPC ...... *G06F 16/24578* (2019.01); *G06F 16/248* (2019.01); *G06F 16/93* (2019.01)

(58) Field of Classification Search
CPC ... G06F 16/24578; G06F 16/248; G06F 16/93
See application file for complete search history.

(56) References Cited

U.S. PATENT DOCUMENTS

| | | | | |
|---|---|---|---|---|
| 7,996,393 B1* | 8/2011 | Nanno | ................. | G06F 16/353 |
| | | | | 707/723 |
| 8,725,666 B2* | 5/2014 | Lemmond | ........... | G06F 16/3344 |
| | | | | 706/13 |
| 10,261,954 B2* | 4/2019 | Grace, Jr. | ......... | G06F 16/24578 |
| 11,550,835 B2* | 1/2023 | Doornenbal | .......... | G06F 16/334 |

(Continued)

FOREIGN PATENT DOCUMENTS

WO    2019080428 A1    5/2019

OTHER PUBLICATIONS

Blanco et al., "Finding support sentences for entities", SIGIR'10, Jul. 19-23, 2010, Geneva, Switzerland, Conference Paper . Jan. 2010, 9 pps., <https://www.researchgate.net/profile/Hugo-Zaragoza/publication/221300411_Finding_support_sentences_for_entities/links/56f0255d08ae70bdd6c94374/Finding-support-sentences-for-entities.pdf>.

(Continued)

*Primary Examiner* — Miranda Le
(74) *Attorney, Agent, or Firm* — Aaron N. Pontikos (57) ABSTRACT

The method provides for receiving a plurality of documents including mentions of a target entity from a search query about the entity. The mentions of the target entity are identified in respective documents of the plurality of documents. Content surrounding the one or more mentions of the target entity are extracted with the mentions within the respective documents and form section. A respective document includes a plurality of sections. Metrics of relevance and irrelevance to the target entity are determined within the (Continued)

plurality of sections of the respective documents. A density score is generated for the plurality of sections of the respective documents. A relevancy score is assigned to respective documents of the plurality of documents, based on the density scores of the sections of the respective documents. The documents are ranked based on the relevancy score and presented in an order based on the ranking.

11 Claims, 3 Drawing Sheets

(56) References Cited

U.S. PATENT DOCUMENTS

| | | | | |
|---|---|---|---|---|
| 2011/0302162 | A1* | 12/2011 | Xiao | G06F 16/29 707/E17.084 |
| 2011/0320437 | A1* | 12/2011 | Kim | G06F 16/958 707/E17.014 |
| 2012/0143869 | A1* | 6/2012 | Padovitz | G06F 16/35 707/E17.089 |
| 2014/0129542 | A1* | 5/2014 | Haveliwala | G06F 16/337 707/710 |
| 2016/0378855 | A1* | 12/2016 | Roberts | G06F 16/3349 707/723 |
| 2019/0325063 | A1* | 10/2019 | Han | G06F 16/24578 |
| 2019/0362021 | A1* | 11/2019 | Balduino | G06Q 30/01 |
| 2019/0392077 | A1 | 12/2019 | Kikuchi | |
| 2020/0320111 | A1* | 10/2020 | Roberts | G06F 16/334 |
| 2020/0341990 | A1 | 10/2020 | Rosenoff | |
| 2021/0149980 | A1 | 5/2021 | Pavlini | |
| 2022/0058220 | A1* | 2/2022 | Kleiman-Weiner | G06F 16/36 |

OTHER PUBLICATIONS

Coffman et al., "Structured Data Retrieval using Cover Density Ranking", KEYS'10, Jun. 6, 2010, Indianapolis, Indiana, USA, 6 pps., Copyright 2010 ACM, <https://citeseerx.ist.psu.edu/viewdoc/download?doi=10.1.1.466.8873&rep=rep1&type=pdf>.

Hegde et al., "An Entity-centric Approach for Overcoming Knowledge Graph Sparsity", 6 pps., downloaded from the Internet on Nov. 22, 2021, <https://talukdar.net/papers/emnlp15_entity_centric_kb_pop.pdf>.

* cited by examiner

RANKING ENTITY SEARCH RESULTS BASED ON INFORMATION DENSITY

STATEMENT REGARDING FEDERALLY SPONSORED RESEARCH OR DEVELOPMENT

This invention was made with United States Government support under contract number 2018-18010800001. The Government has certain rights in this invention.

FIELD OF THE INVENTION

The present invention relates generally to the field of information discovery regarding individuals, and more particularly to prioritizing the presentation of search result documents based on the density of information about the individual within the content of the documents.

BACKGROUND OF THE INVENTION

Online searches involve search engines processing query terms by groups of algorithms to determine the meaning and weight given to terms included in the query. Search results from various elements of the search engine are filtered by the presence or absence of search query terms to arrive at a final set of documents, typically ranked by how well the result document matches the terms included in a query.

Vetting is a process in which a person's background information is investigated and self-provided information is fact-checked, often prior to offering the person employment, appointment to a position, conferring an award, or making decisions in general about a person. In some cases, vetting of information sources is vetted to determine accuracy, reliability, and usefulness.

Online searches directed towards a human entity often include a name and minimal qualifying additional terms, which typically returns results that include sporadic mention of the entity's name across multiple large documents directed to different topics. Searches directed to famous or celebrity entities may produce results that are primarily directed to the search subject, but such results are more of an exception.

SUMMARY

Embodiments of the present invention disclose a method, computer program product, and system for ranking documents of a search result according to relevance to an entity of a search query. The method provides for one or more processors to receive a plurality of documents including one or more mentions of a target entity resulting from a search query about the target entity. The one or more processors identify the one or more mentions of the target entity in respective documents of the plurality of documents. The one or more processors extract content surrounding the one or more mentions of the target entity within the respective documents and including the one or more mentions of the target entity and the extracted content as a section of a plurality of sections of a respective document of the plurality of documents. The one or more processors determine metrics of relevance and irrelevance to the target entity within the plurality of sections of the respective documents. The one or more processors generate a density score, respectively, for the plurality of sections of the respective documents. The one or more processors assign a relevancy score to respective documents of the plurality of documents, based on the density scores of the plurality of sections of the respective documents. The one or more processors rank the documents based on the relevancy score, and the one or more processors present the document in an order based on the ranking.

DETAILED DESCRIPTION

Embodiments of the present invention recognize decision-making often has a dependency on the amount and quality of available data or information relevant to the decision. The ability to access the most pertinent and best quality data relevant to the decision logically support better decision making and techniques that provide the best data quickly enhances decision-making time while maintaining decision quality. Embodiments recognize that the process of discovering information can be accelerated by prioritizing and presenting the most relevant search results to the user first, which is often referred to as relevance to a query. However, when searching and vetting persons as entities, documents that are focused on the target person and provide rich and diverse information can accelerate the discovery process, reduce the use of resources, improve the quality of decision making, and reduce the time to make a decision.

Online searches for information about an entity include search terms often directed to a person or persons but may also include searches directed to a place or recognized object (i.e., thing). Examples may include Albert Einstein as a person, the Florida Keys as a place, or a famous painting as an object. For purposes of brevity and clarity, discussion, and description, herein, will reference and use examples related to a person as a target entity without limitation of embodiments to other forms of entities. Online searches performed by a prior art computing device connected to a network, such as the Internet, identify and return results based on discovery of one or more search terms included in the searchable online content, such as online documents. Embodiments of the present invention recognize that the returned results often are not organized or prioritized and require the user to inefficiently explore each returned item to find those items that are rich in types of information and quantity of information related to the entity search. Embodiments recognize that some search engines will return search results in an order based on the number of instances of search terms found in a content item, but such organization still lacks sorting of returned search items based on the density of information and relevance directed to the target entity.

Embodiments also recognize that activity and processes in which information and characteristics associated with a target entity enable decision making. For example, vetting of applicants for employment, membership, voting, or relationships involve making decisions based on available information and available time. The current presentation of search results fails to identify and prioritize the information content that has a higher level of density and relevance regarding the target entity, which can significantly reduce the time and effort associated with the decision process. Entity decisions can include selection of travel or vacation destinations, information to consider for relocation in job offer decisions, college enrollment, or purchase selections. Embodiments of the present invention provide a practical improvement of computer-based online searches by prioritizing the content that includes greater information density and relevance of a target entity in the presentation of search results to a user.

When researching information about individuals, documents that focus on that individual and provide rich contextual information are typically more helpful than a sporadic mention of that individual in a large document that focuses on a different topic. For instance, if one wants to learn more about Warren Buffet, it is likely that his Wikipedia page is a good reference offering rich information about him, whereas a mention of Warren Buffet's name in a financial article that primarily discusses the viability of index funds is likely to provide less detail and less information in general about Mr. Buffet.

Discovering richer information sources focused on an individual offers convenience and can save time and resources for tasks that require finding critical pieces of information about individuals and making decisions based on that information. Reduced time-to-decision leads to reduces time and cost. Of course, that task is much simpler if one is interested in a prominent figure since Wikipedia is a safe suggestion for in-depth and up-to-date information about that individual. The task becomes much more complex in a corpus that contains information about a large number of individuals, few of whom are well known and in which there is no single document that consolidates all the key information about an individual. Embodiments of the present invention recognize that presenting rich information documents of the search results, ranked by an assessment of relevant information density, to the requesting user first, improves the user's time to discovery and enables improved and more timely decision making.

Embodiments of the present invention provide a method, computer program product and computer system for ranking documents based on the density of target entity relevant information. Embodiments rank documents returned from a search query for a person entity in an order that prioritizes the documents rich with information about the target entity, first. Embodiments enable the user to discover key information about the target entity (i.e., individual of interest) more quickly and, as a result, reduce time and effort while improving the effectiveness of the overall research task.

Embodiments of the present invention receive a search query including the name of a target entity (person). Embodiments perform a search against the unstructured corpus of documents identifying mentions of the entity's name and returning a listing of documents and often include indication of the position of the target entity mentions within the respective document. Embodiments extract a part of each document containing the mention of the target entity, in the form of a snippet. For example, the snippet includes the sentence in which the mention occurs. Embodiments also extract a pre-determined number ("n") of sentences surrounding the mention of the target entity, and embodiments form sections from the snippets and surrounding sentences of the respective document. In some embodiments, overlapping sections are combined into a single section. Sections of respective documents may contain multiple mentions of the target entity.

Embodiments of the present invention perform a relevance scoring associated with the mentions of the target entity within the sections of respective documents. In some embodiments, three metrics are applied to determine an information density score for each section of a document for each document returned from the initial query regarding the target entity. The information density score indicates an amount of target entity information contained within a section of a document, and ultimately reflects the information level of the document. A first metric categorizes other entities in the section as irrelevant or relevant entities, the relevant entities sharing a relationship with the target entity as supported by other documents (typically greater than one other document). A second metric determines the number of relevant entities mentioned within the section and includes all entities, not just human entities. The second metric focuses on documents with high information density about the target entity, with a higher density score indicating more relevant entities mentioned within the section. The third metric identifies information used to identify the target entity, which adds corroboration that the information has a level of discovery certainty regarding the document information is about the target entity.

Embodiments apply the metrics to determine an overall density score for each section of a respective document, and the highest density score among the sections of a document is assigned to the document as a document relevancy score. Embodiments perform a ranking of the documents returned from the search query and present the document to the query author based on the ranking. The ranking presents the documents with the highest relevancy scores first and in a descending order of relevancy scores. The ordered presentation provides the documents with the greatest information density and most relevance to the query-authoring user first, enabling the user to consume the information in the documents most likely to include the amount and detail level of information supporting better decision making regarding the target entity.

The ordered ranking of the documents provides an improvement of efficiency in accessing documents rich in information regarding the target entity. The improved efficiency enables a more complete set of information available to the requesting user and greatly reduces the time required to discover the amount and detail level of information supporting better decision making regarding the target entity.

Figure 1:
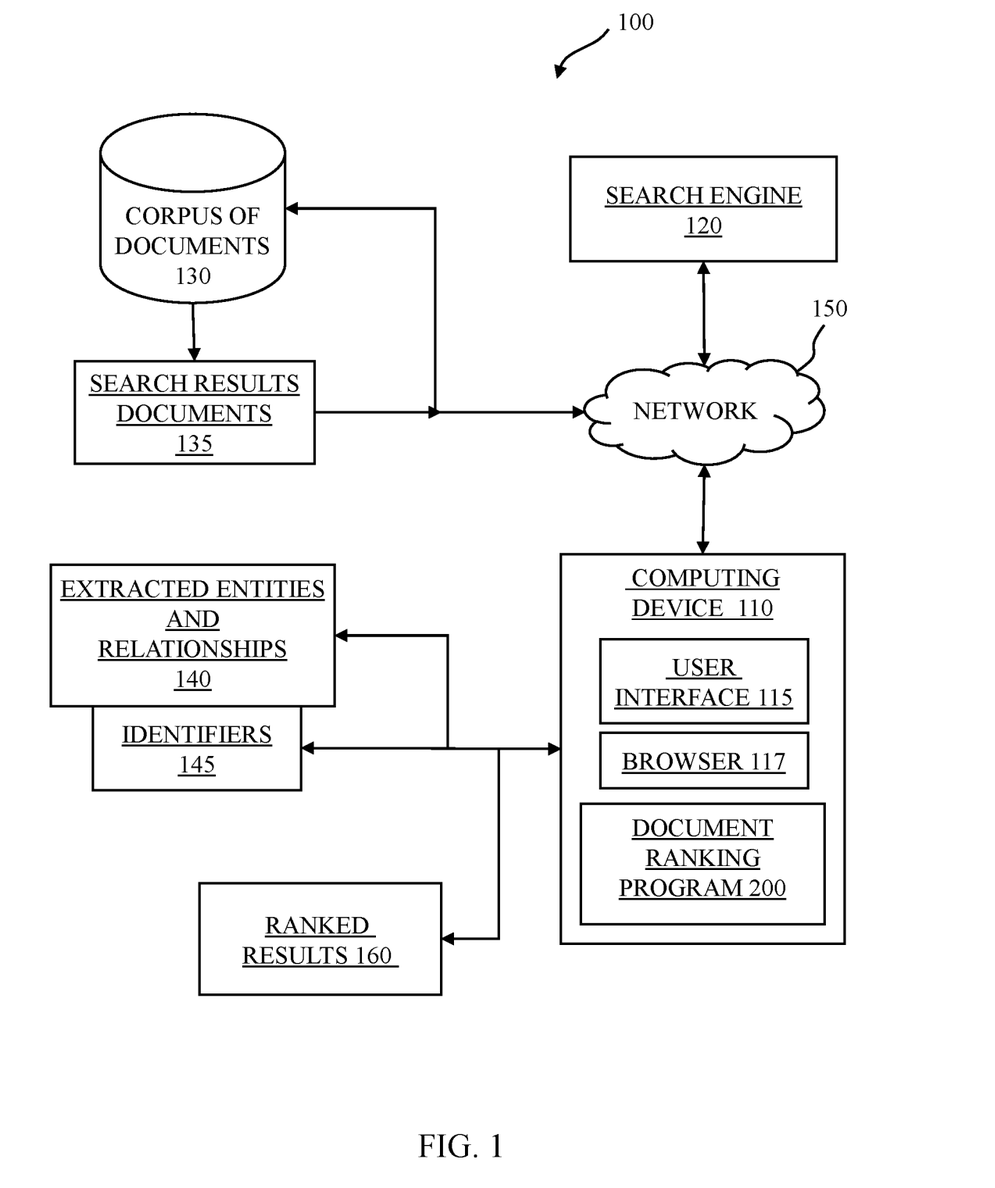
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer processing environment 100 includes computing device 110, search engine 120, and corpus of documents 130, all interconnected via network 150. Distributed computer processing environment 100 also includes returned documents 135, extracted entities and relationships 140, identifiers 145, and ranked results 160. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between computing device 110, search engine 120, corpus of documents 130, and other devices and elements of distributed computer processing environment 100 (not shown).

Search engine 120 receives a query searching for information associated with a target entity via network 150 from a user of computing device 110 operating browser 117. Search engine 120 applies the search criteria of the query to corpus of documents 130 and searches for documents that include a mention of the target entity. Search engine creates a set of a plurality of documents from corpus of documents 130 that includes one or more mentions of the target entity, which forms returns documents 135.

Corpus of documents 130 includes a large number of unstructured documents that include among other things, the names of human entities (people), and content regarding the human entities. In some embodiments, corpus of documents 130 is a pre-existing collection of data and information contained within unstructured text documents, which may or may not include images, illustrations, tables, charts, graphs, and other non-textual content, and includes names of human entities associated with the unstructured content. The term "mentions" as used herein refers to the instances of the name of an entity within documents of corpus of documents 130. In some embodiments, documents of corpus of documents 130 include identifying information associated with the mentions of entities.

Search results documents 135 refers to a plurality of documents as the results of search engine 120 completing a search of corpus of documents 130 and identifying documents that include at least one mention of the target entity included in the query from the user of computing device 110. Search results documents 135 exist as an unordered set of unstructured documents that are received by document ranking program 200, depicted in FIG. 1 as operating on computing device 110, from search engine 120 via network 150.

Extracted entities and relationships 140 provide information used to generate metrics for determining information density scores of respective documents of search results documents 135. Extracted entities and relationships 140 includes identifying instances of a mention of the target entity within each document of search results documents 135, referred to as a snippet, which, for example, includes the sentence in which the target entity mention occurs. A section of a document is formed by the extraction of a pre-determined number, "n", of sentences surrounding the sentence including the mention (snippet) within a document. The overlapping sentences of snippets are combined into a single, larger section. The set of sections of the document includes information associated with the mention of the target entity and excludes all other irrelevant content of the document. The sections are then analyzed to determine additional entities and whether there is a relationship of the additional entities with the target entity. The relevant and irrelevant relationship entities are applied to generating metrics used to score the information density of each section of respective documents of search results documents 135.

Identifiers 145 provide additional corroborating information confirming the respective document includes information about the target entity. Identifiers 145 includes information items that identify the target entity, such as phone number, email address, physical address, social media user-name, and other identifying information. Identifiers 145 are used to generate metrics that determine relevance scores for sections of respective documents of search results documents 135.

Ranked results 160 comprises an ordering of search results documents 135 that ranks the order of presentation of documents based on an information density score of the respective document. Document ranking program 200 returns ranked results 160 to user interface 115 such that the display of ranked results 160 presents the documents in an order of information density levels about the target entity with the document having the highest density score presented before the document with the next-highest level density score.

Computing device 110 includes user interface 115, browser 117, and document ranking program 200. In some embodiments, computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a wearable item or be included in a wearable item of a user. In still other embodiments, computing device 110 may be a computing device interacting with applications and services hosted and operating in a cloud computing environment. In another embodiment, the computing device 110 can be a netbook computer, a personal digital assistant (PDA), or other programmable electronic devices capable of receiving data from and communicating with other devices (shown and not shown) in distributed computer processing environment 100, via network 150, as well as performing operations of document ranking program 200. Alternatively, in some embodiments, computing device 110 may be communicatively connected to document ranking program 200, operating remotely. Computing device 110 may include internal and external hardware components, depicted in more detail in FIG. 3.

User interface 115 provides an interface to access the features and functions of computing device 110. In some embodiments of the present invention, user interface 115 provides access to operate and select options for document ranking program 200 and also supports initiation and interaction with browser 117, enabling the user of computing device 110 to access the Internet resources and submit queries directed to corpus of documents 130. User Interface 115 also provides a display of output for functions and applications of computing device 110, including a display of ranked results 160 from document ranking program 200, enabling the user of computing device 110 to select and view documents from ranked results 160. The installation of user interface 115 on computing device 110, enables the user of computing device 110 to access additional features and functions of computing device 110 (not shown).

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 to receive, view, hear, and respond to input, access applications, display content of online conversational exchanges, and perform available functions.

Browser 117 provides computing device 110 access to online resources via network 150. In embodiments of the present invention, browser 117 provides access for a user of computing device 110 to submit a query regarding a target entity (person) to search engine 120, which in turn accesses corpus of documents 130 and returns search results documents 135 via network 150.

Document ranking program 200 ranks documents returned from a target entity search query, such that documents that are rich with information about that entity are prioritized and presented in a prioritized ranking to the query author. Document ranking program 200 enables discovering key information about the target entity more quickly and with greater detail, and, as a result, improves the effectiveness and reduces the time and effort of the overall research task.

Document ranking program 200 receives search results documents 135 from a query submitted by a user of computing device 110, regarding a target entity. Document ranking program 200 identifies the mentions of the target entity in each document of the plurality of documents of search results documents 135 and captures sentences surrounding the mentions, forming a section of the document. The overlapping surrounding sentences of snippets become combined to form a single larger section. The extraction of snippets, surrounding sentences, and formation of sections are repeated for the respective documents of search results documents 135. Document ranking program 200 determines the relevant and irrelevant entities included in each section of respective documents.

Document ranking program 200 generates three metrics for each section of respective documents including metrics determining the number of irrelevant entities, the number of relevant entities, and identifying information about the target entity. Document ranking program 200 calculates a density score for each section of respective documents of search results documents 135 and assigns the highest determined density score among sections of a respective document, to the respective document. The information density score is determined as a quotient of the combination of the number of related entities and the identifier count, and the number of unrelated entities. The highest density score of sections of a respective document is assigned as the relevancy score (also referred to herein as the information density score) of the respective document.

Document ranking program 200 ranks the documents of search results documents 135 by the relevancy score and presents the respective documents in an order of highest relevancy score to lowest relevancy score.

Figure 2:
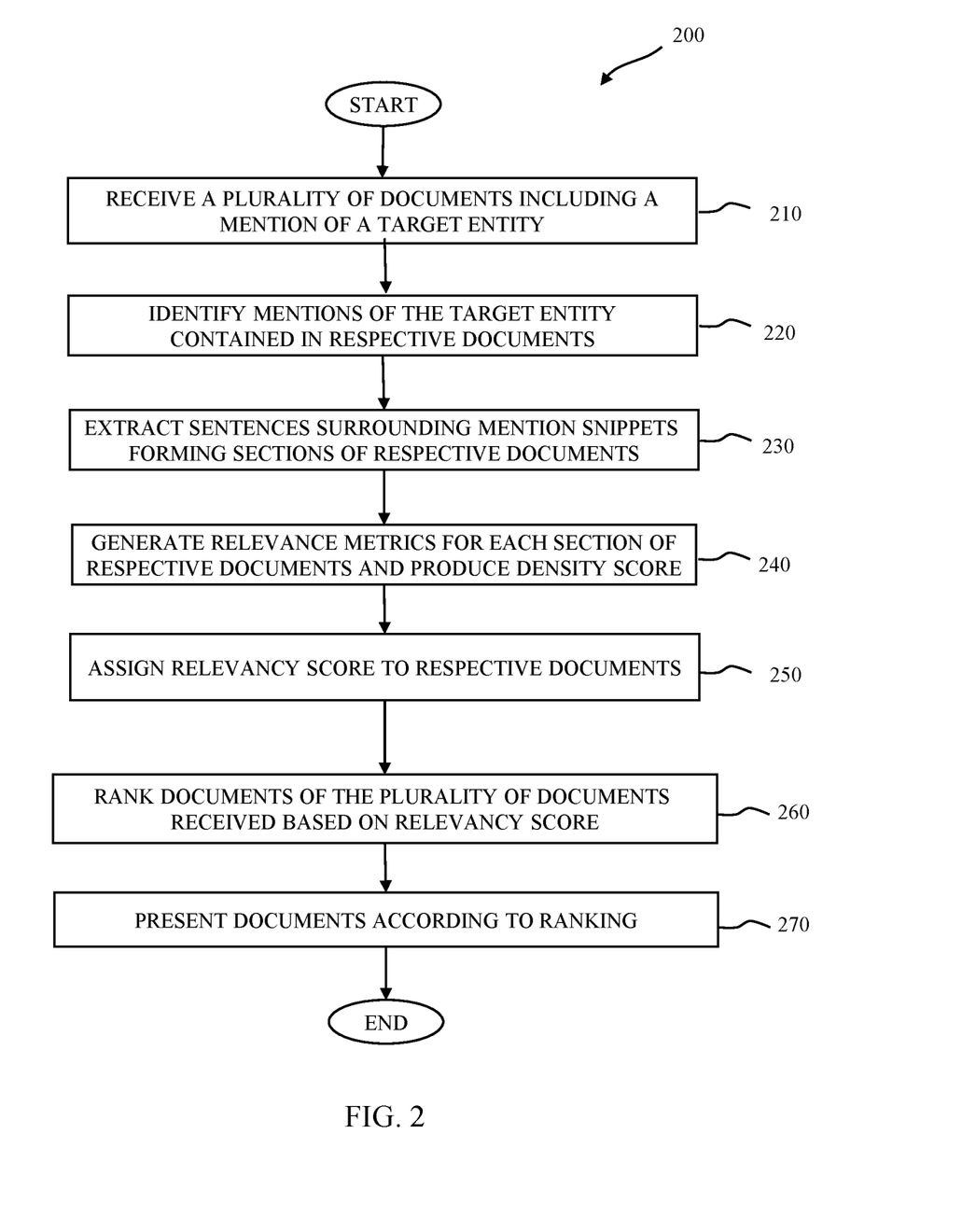
FIG. 2 depicts a flowchart of the operational steps of a document ranking program, in accordance with an embodiment of the present invention.

FIG. 2 depicts a flowchart depicting the operational steps of document ranking program 200 operating in distributed computer processing environment 100 of FIG. 1, in accordance with embodiments of the present invention.

Program 200 receives a plurality of documents that include a mention of a target entity (step 210). A user of a computing device configured with a browser application capable of submitting online searches submits a query to an online search engine for information about a person designated as a target entity. Document ranking program 200 receives a plurality of unstructured documents from the search engine and each respective document of the plurality of unstructured documents includes at least a mention of the target entity.

For example, a user of computing device 110, using user interface 115, submit a query about a target entity to search engine 120. Search engine 120 performs a search in corpus of documents 130 for documents that include at least a mention of the target entity. Document ranking program 200 receives search results documents 135 from search engine 120. Each respective document of search results documents 135 includes at least a mention of the target entity.

Document ranking program 200 identifies mentions of the target entity contained in respective documents (step 220). Document ranking program 200 identifies the location of mentions in the respective documents received from the target entity query. Document ranking program 200 extracts the part of the document that mentions the name of the target entity.

For example, document ranking program 200 finds multiple mentions of the target entity's name in a first document of search results documents 135. Document ranking program 200 extracts the mention from the document as a snippet, for example, by extracting the sentence in which the mention occurs. Document ranking program 200 performs extraction of all mentions for the first document and subsequently does the same for all respective documents of search results documents 135.

Document ranking program 200 extracts sentences surrounding a mention forming a snippet and forms sections for respective documents (step 230). Document ranking program 200 extracts sentences surrounding the snippet containing the mention of the target entity. The extracted sentences add information and context to the mention of the target entity. In some embodiments, extraction of a predetermined configurable number of sentences ("n"), along with the snippet, forms a section of the respective document. In some embodiments, overlapping sentences surrounding snippets are combined into a single, larger section. In some embodiments, a document containing many mentions of the target entity may result in one section that includes a large portion or all of a document.

For example, document ranking program 200 selects 4 sentences surrounding a snippet containing a mention of the target entity, forming sections for each snippet of a first document of search results documents 135. Document ranking program 200 combines two snippets and their surrounding sentences that overlap, forming a single section. Document ranking program 200 forms sections for the snippets or combined snippets for each document of search results documents 135.

Document ranking program 200 generates relevance metrics for each section of respective documents and produces a density score (step 240). Document ranking program 200 scores each section of each document of the plurality of respective documents returned from the query about the target entity, which indicates an amount of relevant information about the target entity in the section of the document. The section scores are determined as a quotient of a sum of two metrics divided by a third metric.

Document ranking program 200 determines a first metric (a) by classifying all the entities (i.e., other entities mentioned besides the target entity) as relevant or irrelevant to the target entity, referred to as unrelated entity mention density. A relevant entity is one that shares a relationship with the target entity in which the relationship is supported in "m" other documents outside of the current section document. In some embodiments, the number "m" of other documents supporting the other entity's relationship with the target entity is greater than 1 (>1) to reduce low confidence relationships that add minimal or any information about the target entity. In some embodiments, the number "m" may be higher for a large corpus of documents. Metric (a) expresses the density of unrelated person entities in sections of a document indicating whether the section is focused on the target entity. A higher metric (a) score indicates the section is not focused on the target entity and has little or no relevant information.

In some embodiments, the documents returned from the search query may include many duplicated or near-duplicated documents. Such a condition may occur if the same list of entities (e.g., top CEOs) was repeated in multiple documents or across multiple timeframes. If the target entity is prevalent across the corpus of documents, then there may be many documents that include disingenuous relationships and may seem relevant due to the number of documents the relationship appears in. In such cases, document ranking program 200 constructs a diverse sub-corpus by selecting a fixed parameter "p" as the number of representative document classes (e.g., 100) and selects a similarity metric (pre-determined and provided to document ranking program 200 for such cases). Document ranking program 200 determines the similarity of random documents and selects "p" documents that are distinct according to the similarity metric. From the sub-corpus, document ranking program 200 determines the relevance and irrelevance of entities to the target entity across the representative document classes rather than across individual documents.

Document ranking program 200 determines a second metric (b) that captures the number of entities mentioned in the vicinity of the target entity mention that are relevant to the target entity, referred to as target-related information. Relevance is determined as a shared relationship between the other entity and the target entity that is supported by at least "m" documents (other than the current document). The entities captured by metric (b) are not limited to person entities, but all entities supported by relevance relationship in "m" other documents. The target-related information metric embraces the notion that documents including greater numbers of relevant entities (i.e., higher information density) are likely to offer richer sources of information about the target entity.

Document ranking program 200 determines a third metric (c), referred to as relevant identifying information. Document ranking program 200 identifies occurrences of information within document sections that can be used to identify the target entity and additionally supports search terms enhancing the further exploration of the target entity. Identifier information can include phone numbers, email addresses, social media usernames, physical addresses, and factual elements of the target entity's accomplishments and history (i.e., schools attended, publications, patents, etc.). Identifiers occurring in documents may serve as corroboration that the document content is related to the target entity. Larger numbers of identifiers of the target entity produce larger section density scores.

For example, document ranking program 200 generates three metrics by accessing a first document from search results documents 135 and categorizes the other entity mentions in each section of the first document as having a relevant or irrelevant relationship with the target entity. Document ranking program 200 determines the number of irrelevant entities mentioned in each section of the first document as the first metric (a). Document ranking program 200 repeats the unrelated entity mention density metric for all documents of search results documents 135. Document ranking program 200 captures the number of entities mentioned in the vicinity of the target entity mention that are relevant to the target entity, referred to as the target-related information metric (b). The related entities are not limited to person entities. Document ranking program 200 determines the number of other entities related to the target entity that meet the required support of the relationship in "m" other documents as the second metric. Document ranking program 200 determines the number of identifiers of the target entity occurring in each section of the first document and captures the number of identifiers as the third metric (c).

Document ranking program 200 determines the density score for each section of respective documents returned from the query about the target entity. Document ranking program 200 performs a density calculation in which related entities are summed with identifiers of the target entity and form a quotient with the unrelated entities as a divisor.

$$\text{Density Score}_{section\ i} = (\text{entities\_related} + \text{identifier\_count})/(\text{entities\_unrelated}).$$

Document ranking program 200 assigns a relevancy score to respective documents (step 250). Document ranking program 200 determines the highest density score among the sections of a respective document and assigns the highest density score corresponding to a section of the respective document as a relevancy score for the respective document. For example, if five sections of the first document received density scores of 2.7, 4.2, 5.9, 4.1, and 3.6, respectively, the first document receives a relevancy score of 5.9. Document ranking program 200 performs density scoring for each section of all respective documents returned from the query request about the target entity, and similarly assigns the highest section density score of a respective document as a relevancy score of the respective document.

Document ranking program 200 ranks the documents of the plurality of documents received based on relevancy scores (step 260). Having assigned a relevancy score to all respective documents returned from the target entity query, document ranking program 200 performs a ranking of the documents, based on the document with the highest relevancy score ranking higher than the document with the next-highest relevancy score, and so on.

Document ranking program 200 presents the documents according to the ranking (step 270). Having ranked all the documents returned from the query of the target entity, document ranking program 200 presents the documents in an order according to the ranking. For example, document ranking program 200 presents the documents in a display on user interface 115 of computing device 110, presenting selectable document titles in the order ranked by density scores of the respective documents.

Having presented the documents according to the ranking, document ranking program 200 ends.

Figure 3:
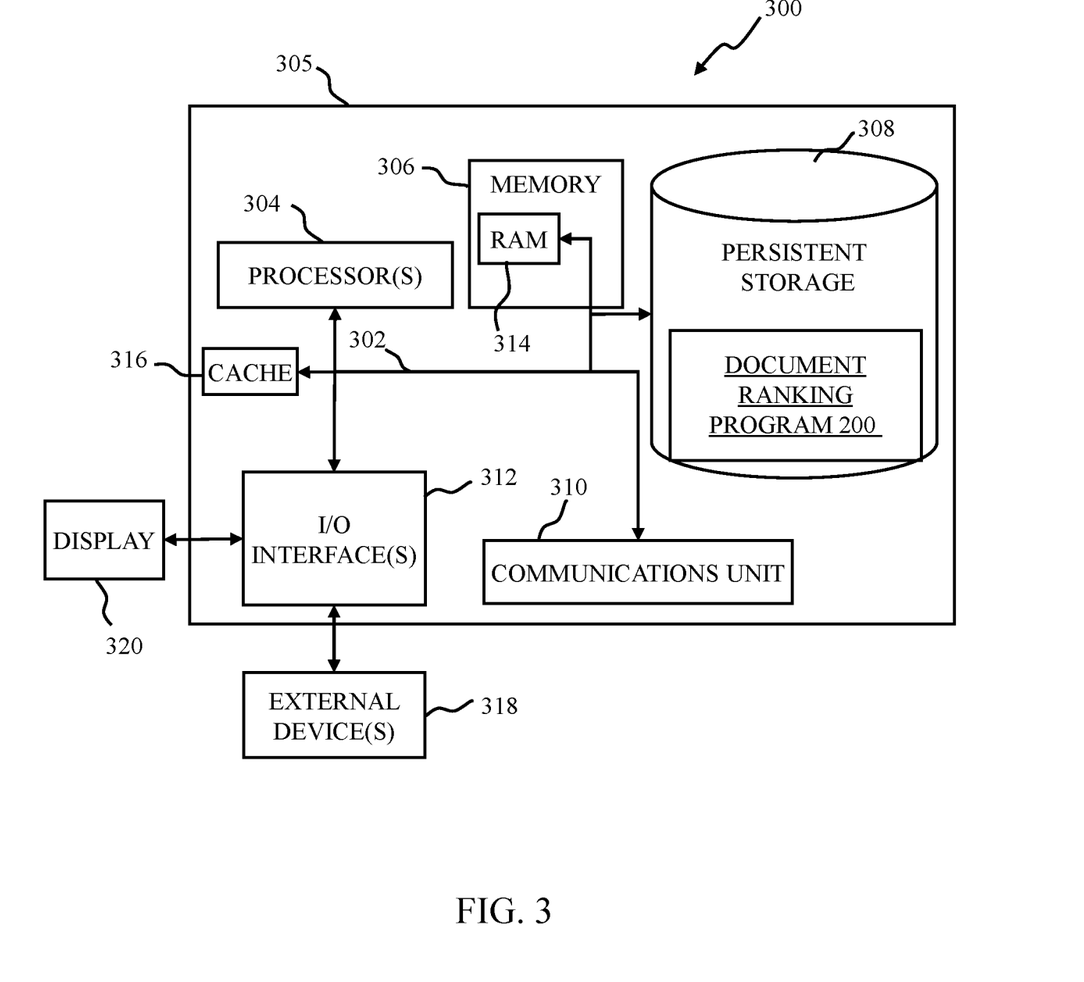
FIG. 3 depicts a block diagram of components of a computing system, including a computing device configured to operationally perform the document ranking program of FIG. 3, in accordance with an embodiment of the present invention.

FIG. 3 depicts a block diagram of components of computing system 300, including computing device 305, configured to include or operationally connect to components depicted in FIG. 1, and with the capability to operationally perform document ranking program 200 of FIG. 2, in accordance with an embodiment of the present invention.

Computing device 305 includes components and functional capability similar to components of computing device 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment document ranking program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed computer processing environment 100. In these examples, communications unit 310 includes one or more network interface cards. Communications unit 310 may provide communications through the use of either or both physical and wireless communications links. Document ranking program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., document ranking program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, section, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for ranking documents of a search result according to relevance of a query of an entity, the method comprising:

receiving a plurality of documents in which respective documents include one or more mentions of a target entity resulting from a search query about the target entity;

identifying the one or more mentions of the target entity in the respective documents of the plurality of documents;

extracting content surrounding the one or more mentions of the target entity within the respective documents and including the one or more mentions of the target entity and the extracted content as a section of a plurality of sections of a respective document of the plurality of documents;

determining metrics of relevance and irrelevance of other entities mentioned within the extracted content surrounding the one or mentions of the target entity, within the plurality of sections of the respective documents, to the target entity, wherein a relevant entity shares a relationship with the target entity if the relevant entity and the target entity are mentioned in a same section of extracted content among a pre-determined number of other respective documents;

generating an information density score, for the plurality of sections of the respective documents, based on a combination of a number of relevant entities and an identifier entity count with respect to the number of irrelevant entities, wherein irrelevant other entities lack a relationship with the target entity that is supported by a pre-determined number of other documents of the plurality of documents resulting from the search query, and wherein an identifier entity includes information associated with the identity of the target entity;

assigning a relevancy score to the respective documents of the plurality of documents, based on the density scores of the plurality of sections of the respective documents, wherein the relevancy score equals a highest density score of a section of the document;

ranking the respective documents based on the relevancy score; and presenting the respective documents in an order based on the ranking.

2. The method according to claim 1, wherein the entity comprises a person.

3. The method according to claim 1, wherein the extracted content comprises a sentence that includes the mention of the target entity and a set of sentences surrounding the mention in the document.

4. The method according to claim 1, further comprising; creating a sub-corpus of distinct document classes including a selection of a subset of the plurality of documents, based on applying a similarity metric to the plurality of documents.

5. The method of claim 1, wherein identifying the mention includes identifying a sentence in which the mention occurs within a document of the plurality of documents and referring to the sentence as a snippet of the document; and combining two or more snippets in which content extracted that surrounds the mention of the target entity overlaps between the two or more snippets, and the combined snippets and corresponding content extracted, resulting in a section of the document.

6. A computer program product for ranking documents of a search result according to relevance of a query of an entity, the computer program product comprising:

one or more computer-readable storage media, and program instructions stored on the one or more computer-readable storage media, the program instructions comprising:

program instructions to receive a plurality of documents in which respective documents include one or more mentions of a target entity resulting from a search query about the target entity;

program instructions to identify the one or more mentions of the target entity in the respective documents of the plurality of documents;

program instructions to extract content surrounding the one or more mentions of the target entity within the respective documents and including the one or more mentions of the target entity and the extracted content as a section of a plurality of sections of a respective document of the plurality of documents;

program instructions to determine metrics of relevance and irrelevance of other entities mentioned within the extracted content surrounding the one or mentions of the target entity, within the plurality of sections of the respective documents, to the target entity, wherein a relevant entity shares a relationship with the target entity if the relevant entity and the target entity are mentioned in a same section of the extracted content among a pre-determined number of other respective documents;

program instructions to generate an information density score, for the plurality of sections of the respective documents, based on a combination of a number of relevant entities and an identifier entity count with respect to the number of irrelevant entities, wherein irrelevant other entities lack a relationship with the target entity that is supported by a pre-determined number of other documents of the plurality of documents resulting from the search query, and wherein an identifier entity includes information associated with the identity of the target entity;

program instructions to assign a relevancy score to the respective documents of the plurality of documents, based on the density scores of the plurality of sections of the respective documents, wherein the relevancy score equals a highest density score of a section of the document;

program instructions to ranking the respective documents based on the relevancy score; and program instructions to present the respective documents in an order based on the ranking.

7. The computer program product of claim 6, further comprising:

program instructions to create a sub-corpus of distinct document classes including a selection of a subset of the plurality of documents, based on applying a similarity metric to the plurality of documents.

8. The computer program product of claim 6, further comprising:

program instructions to identify a sentence in which the mention occurs within a document of the plurality of documents and referring to the sentence as a snippet of the document; and program instructions to combine two or more snippets in which content extracted that surrounds the mention of the target entity overlaps between the two or more snippets, and the combined snippets and corresponding content extracted, resulting in a resulting in a section of the document.

9. A computer system for ranking documents of a search result according to relevance of a query of an entity, the computer program product comprising:

one or more computer processors;

one or more computer-readable storage media, and program instructions stored on the one or more computer-readable storage media, the program instructions comprising:

program instructions to receive a plurality of documents in which respective documents include one or more mentions of a target entity resulting from a search query about the target entity;

program instructions to identify the one or more mentions of the target entity in respective documents of the plurality of documents;

program instructions to extract content surrounding the one or more mentions of the target entity within the respective documents and including the one or more mentions of the target entity and the extracted content as a section of a plurality of sections of a respective document of the plurality of documents;

program instructions to determine metrics of relevance and irrelevance of other entities mentioned within the extracted content surrounding the one or mentions of the target entity, within the plurality of sections of the respective documents, to the target entity, wherein a relevant entity shares a relationship with the target entity if the relevant entity and the target entity are mentioned in a same section of the extracted content among a pre-determined number of other respective documents;

program instructions to generate an information density score, for the plurality of sections of the respective documents, based on a combination of a number of relevant entities and an identifier entity count with respect to the number of irrelevant entities, wherein irrelevant other entities lack a relationship with the target entity that is supported by a pre-determined number of other documents of the plurality of documents resulting from the search query, and wherein an identifier entity includes information associated with the identity of the target entity;

program instructions to assign a relevancy score to the respective documents of the plurality of documents, based on the density scores of the plurality of sections of the respective documents, wherein the relevancy score equals a highest density score of a section of the document;

program instructions to ranking the respective documents based on the relevancy score; and program instructions to present the respective documents in an order based on the ranking.

10. The computer system of claim 9, further comprising;

program instructions to create a sub-corpus of distinct document classes including a selection of a subset of the plurality of documents, based on applying a similarity metric to the plurality of documents.

11. The computer system of claim 9, further comprising:

program instructions to identify a sentence in which the mention occurs within a document of the plurality of documents and referring to the sentence as a snippet of the document; and program instructions to combine two or more snippets in which content extracted that surrounds the mention of the target entity overlaps between the two or more snippets, and the combined snippets and corresponding content extracted, resulting in a section of the document.

* * * * *